Patented Oct. 19, 1926.

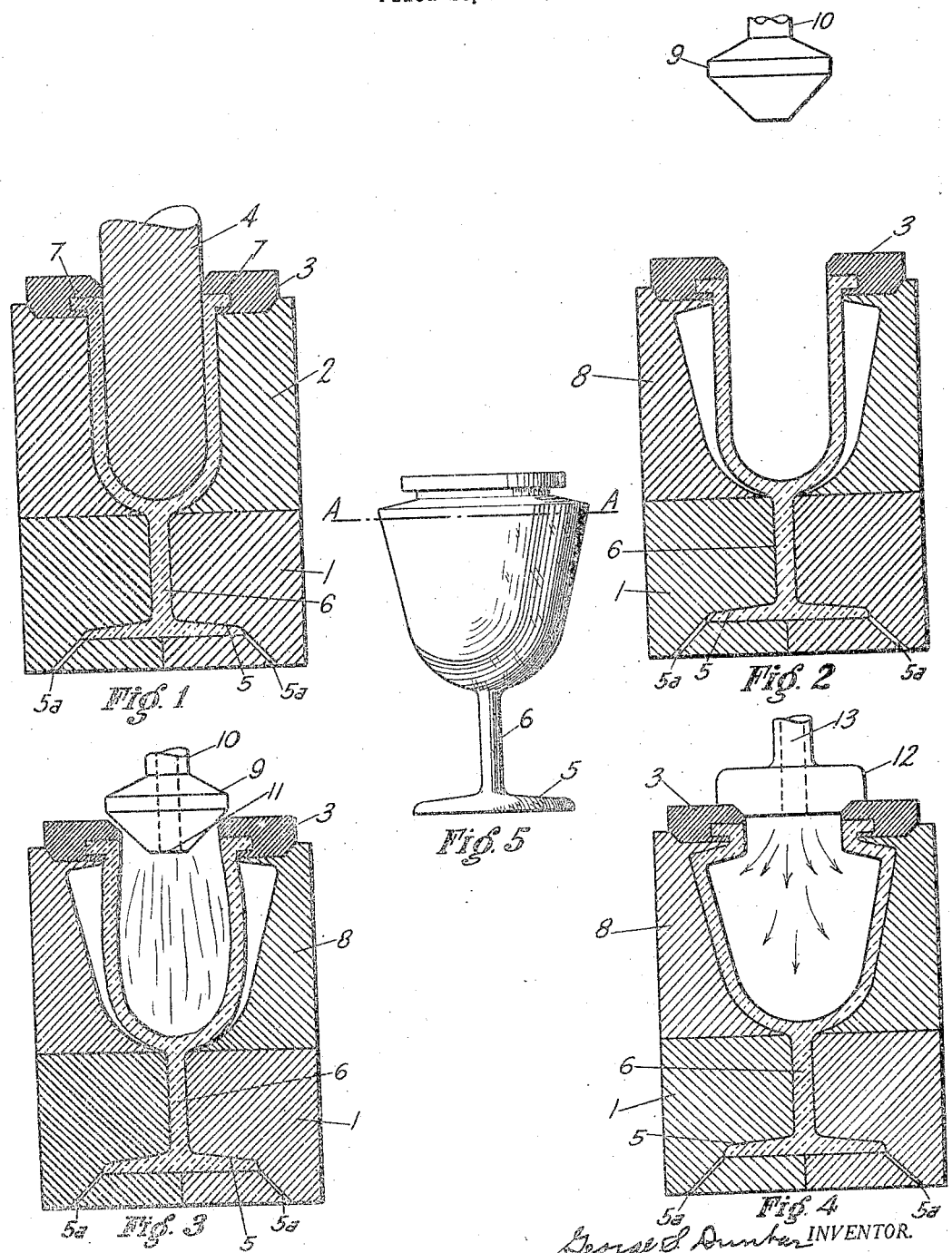

1,603,524

UNITED STATES PATENT OFFICE.

GEORGE S. DUNBAR, OF COLUMBUS, OHIO, ASSIGNOR TO THE FEDERAL GLASS COMPANY, OF COLUMBUS, OHIO, A CORPORATION OF OHIO.

METHOD OF MANUFACTURING STEMMED GLASSWARE.

Application filed September 29, 1924. Serial No. 740,431.

My invention relates to a method of manufacturing stemmed glassware, and has to do, particularly, with the manufacturing of high quality pressed and blown stemmed and footed articles of glassware, such as goblets, having a foot, stem and bowl.

In the manufacture of high quality articles of glassware, such as goblets, as shown in the annexed drawing, it is essential that means be employed in the making of such ware in such a way that a high-grade finish will be imparted to the ware and that there will be no marks or scars upon the glass to mar its quality. In high quality stemmed glassware, such as goblets, it is essential that the walls of the bowl portion be thin, yet of such strength and durability as to withstand the ordinary conditions of use without breaking.

It has been found that it is practically impossible to make stemmed glassware with thin-walled bowls by pressing methods. Furthermore, if a piece of stemmed glassware, such as a goblet, is formed solely by a pressing method, the quality of the ware is very low.

Furthermore, due to the irregular shapes and design of stemmed and footed glassware, such as goblets, it has heretofore been found impractical to manufacture such ware of a desired high quality by automatic machine methods, and it has been found necessary, prior to my invention, in view of the above and in view of the obstacles obviously presenting themselves in the making of high quality, thin-walled glassware by the pressing method, to manufacture high quality stemmed and footed glassware largely by the hand-blowing method.

The making of stemmed glassware by the hand method is a tedious and expensive process which depends solely upon the skill of a number of workmen. In the making of stemmed and footed glassware by the usual hand method, it is the practice for a hand gatherer to gather a mass of glass upon a blow pipe and form the blowing blank by the proper manipulation of the blow pipe. This blank is so manipulated by a workman and shaped by implements and tools that an extended portion is formed thereon, which eventually becomes the stem of the article. When the blow blank is so shaped, the workman inserts the blank in a mold and blows through the blow pipe to form the bowl portion, the stem portion being formed integral with the bowl. The formed bowl portion, with its integral stem still being carried by the blow pipe, is then removed from the mold and is transferred to the hands of another skilled workman. At this point in the operation still another skilled workman gathers a mass of glass on a punty rod and manipulates the glass gathered so that it will form a desired shape. The glass so gathered is then deposited upon the end of the stem of the partly finished article, which has been formed as above stated. The glass deposited upon the end of the stem is severed from the punty rod by a pair of hand shears. At this period in the operation, the glass forming the stem is in such a condition that when the mass of glass is deposited on the end thereof by the punty, the portion so deposited will be readily welded to the stem. After this, a skilled workman with the use of a proper tool shapes the welded portion into a disc or other desirable shape to form the foot of the article. The article is then detached from the blow pipe and properly annealed. After the article, so formed, has been annealed the top portion is cut off in the ordinary manner and made smooth and polished.

In the above method of making stemmed and footed glassware by hand, it is readily seen that quality and uniformity of successive articles depend solely upon the skill of the workmen. They depend not only upon the skill of a single workman, but depend upon the skill of a great number of different workmen. The work to be performed by the different workmen is so related that, if one should carry out his step improperly, the ultimate object would in most cases fail.

Furthermore, in the hand method of making stemmed and footed glassware, the finished article may be weakened at the welded joint, which would, in effect, reduce the quality of the ware as well as lessen the length of its life.

An object of my invention is to provide for the manufacture of stemmed and footed glassware of high quality by the press and blow process whereby the foot, stem and bowl of the article are formed integrally and all welded joints are eliminated.

A further object is to provide a method for mechanically fabricating a high quality of stemmed and footed glassware, such as goblets, having thin-walled bowls, without dealing with the problems of the human element.

Another object of my invention is to make high quality stemmed and footed glassware having a thin-walled bowl portion wherein successive articles produced will be uniform as to quality, weight, shape, size and dimensions.

A still further feature of my method is the formation of the glass article by the press and blow method wherein, the bowl blank, stem and foot are all formed integral by a single operation, the bowl blank being blown to its final form thereafter. In this operation the same pressing plunger which forms the foot and stem, forms the bowl blank.

A further feature of my invention is that it provides for the making of stemmed and footed glassware having foot, stem and bowl of widely varying contours, at the same time maintaining uniformity and cheapness of product and increasing production.

My method may consist, generally, in first depositing glass in a blank or press mold and then causing a pressing plunger to move downward into the blank or press mold so as to force the glass into the various mold recesses to form the foot and stem of the article, at the same time, forcing the glass around the plunger in the mold to form the bowl blank (Figure 1). When the pressing plunger is so operated, the foot, stem and bowl blank are all formed simultaneously as a single integral piece. The foot, stem and bowl blank may be formed in a sectional mold which may be so constructed that the portion of the mold enclosing the bowl blank is removable so that, upon the completion of the operation just stated, the bowl blank portion may be removed and a blow mold portion substituted therefor (Figure 2).

During the substitution of the blow mold for the bowl blank mold, the stem and foot of the article, which have been formed as one integral piece by the operation of the plunger in forming the bowl blank, may be retained in the mold portion in which they were originally formed. After the blow mold portion has been substituted for the blank mold portion, a blow head of the ordinary construction is moved in operative relation therewith and the article is blown to its final form (Figure 4).

It has been found that it may be desirable to fire polish the interior of the glass article in some instances to add to its quality. Therefore, in connection with my invention, I may employ an ordinary flame or gas and air burning under pressure for fire polishing the glass article. This fire polishing may take place just prior to the final blowing of the article (Figure 3) or after the article has been blown to the shape of the blow mold. That is to say, a fire head which has an ordinary flame or gas and air burning therein under pressure and issuing therefrom may be moved into alignment with the mouth of the blow mold either just after the blow mold portion has been substituted for the blank mold portion (as shown in Figure 3) or after the operation shown in Figure 4, namely, after the blow head has been moved into position and the article shaped. In either event as this fire head moves into alignment with the mouth of the mold, gas and air burning under pressure, issues therefrom and is directed into the interior of the already formed glass. This fire head may be adapted to approach a seating position on the mold ring carried by the blow mold with varying degrees of closeness, but may or may not seat on the mold ring, depending upon the conditions of use. In using the fire head as stated, a heat treatment is applied to the interior of the blank or fully blown article which is effective to eliminate any marks or scars or roughened surfaces on the interior of the article caused by contact with the pressing plunger in forming the blank. The result of this treatment is that a high polish is added to the internal walls of the glass article whereby a clear and high quality article is produced.

Furthermore, in carrying out my method, if the fire head with gas and air under pressure issuing therefrom in a state of combustion is employed and it is brought into operation before final blowing, it may be so operated in its movement toward the mouth of the mold that a sufficient pressure will be admitted to the interior of the bowl blank to cause it to expand slightly, wherefore under some conditions of use the blank may be in a more desirable condition for the final blowing. After this initial expansion of the blank, the ordinary blow head will then be moved into position on the mold ring and the article finally blown. When using the fire head, I may vary the pressure of the mixture of gas and air fed to vary the intensity of the flame as well as to vary the pressure of the flame admitted to the glass. In some instances of use I may cause the fire head to seat upon the mold ring or mouth of the mold wholly. The article may be blown to its final shape by the combustible mixture therein, thereby eliminating the use of the ordinary blow head.

The practice of my method does not depend upon any particular or specific apparatus. One form of apparatus which I may employ in carrying out my method is shown in the annexed drawing wherein,—

Figure 1 is a vertical sectional view of a blank or press mold showing the foot, stem and bowl blank of the article already formed as one integral piece by a single operation.

Figure 2 is a vertical sectional view of the mold showing the bowl blank mold portion removed and the bowl blow mold portion substituted therefor.

Figure 3 is the same as Figure 2 except that a fire head is shown in such a position that gas and air burning under pressure is directed into the interior of the bowl blank, the bowl blank being slightly expanded.

Figure 4 shows the fire head removed and the blow head in position, and the article fully blown.

Figure 5 shows the shape of the article when it is removed from the mold and ready for the annealing and finishing operation.

Referring particularly to the drawings, I may employ a blank or press mold which comprises a foot and stem mold portion 1. This foot and stem mold portion may be comprised of two sections which may be opened in order to remove the completed article from the mold. The press or blank mold may also comprise a bowl blank mold portion 2 carrying a mold ring 3. The blank mold portion 2 is formed in sections in order that it may be readily removed upon formation of the bowl blank. The foot and mold portion 1 and the bowl blank portion 2 may be held in proper alignment by any suitable and desired means.

In the making of stemmed and footed glassware by my method, the press or blank mold, which carries the mold ring 3, is moved to a position to receive a charge of glass. I, preferably, deliver glass to the mold by automatic means for feeding molten glass, but it is obvious that my method may also be carried out by feeding the glass to the mold by hand. When the charge of glass has been deposited in the bowl blank mold cavity, the plunger 4 is caused to move downward into the bowl blank mold cavity whereupon the molten glass is forced downward into the foot and stem cavities of the foot and stem mold to form the foot 5 and stem 6 of the article. At the same time that the foot 5 and stem 6 are formed, the molten glass is forced up around the plunger 4 against the wall of the bowl blank mold cavity and into the grooves 7 of the mold ring 3. The plunger 4 is then removed.

In order to prevent the trapping of air in the foot and stem cavities in the foot and stem mold portion 1 when the plunger 4 is moved downward to form the foot, stem and bowl blank, I provide the small air vents 5ª. These air vents 5ª lead from the foot cavity to the outer portion of the foot and stem mold and atmosphere. The vents 5ª are of such size as to readily vent the air from the foot cavity but are small enough to prevent the viscous glass from entering therein. Although I have shown the vents 5ª for venting the foot cavity, yet such showing is merely illustrative and I may employ any well-known means for venting the foot cavity.

According to the apparatus shown in the drawings, upon the removal of the plunger 4, the bowl blank mold portion 2 is removed. The foot 5 and the stem 6 remain in and are carried by the foot and stem mold portion 1. The bowl blank is supported by and carried by the mold ring 3.

As soon as the bowl blank mold portion 2 has been removed, the blow mold portion 8 is moved into position upon the foot and stem mold portion 1. The substitution of the blow mold portion 8 for the blank mold portion 2 may take place in any suitable and desired manner. When the blow mold portion 8 is moved into position upon the foot and stem mold portion 1, these portions may be held in proper alignment by any suitable and desirable means.

If I employ in my method the previously mentioned heat treatment for polishing the glass articles, I may use a fire head 9 (Figure 3). In case the fire head is brought into operation before the blank has been blown or before the operation shown in Figure 4, the manner in which it may be used is shown in Figure 3. Figure 3 shows the fire head 9 in an operative relation to the mold and the blank contained therein, but before it is brought into such operative relation it may be disposed above the mold as shown in Figure 2. The fire head 9 may be carried by a pipe or hollow stem 10 to which is connected properly proportioned gas and air which issues from the nozzle 11 of the fire head 9 in a state of combustion under pressure. The gas and air pressures may be controlled by any suitable means, such as by an injector. The gas and air issuing from the nozzle 11 may be continuously or intermittently lighted. In any event, as the fire head 9 is moved downward toward the mold ring 3, I cause the gas and air issuing from the nozzle 11 to burn under pressure. As this fire head 9 approaches the mold ring 3, the gas and air issuing from the nozzle 11 and burning under pressure is directed into the interior of the bowl blank, as shown in Figure 3 of the drawing. This gas and air burning under pressure reheats the inner walls of the blank and thus fire polishes the inner walls of the blank. The polish thus imparted to the blank is retained during the final blowing process so that the completed article has its interior wall fire polished. This gas and air burning under pressure being directed into the interior of the blank at this stage of the operation eliminates any cloudiness and roughness caused by the plunger 4 so that a perfectly clear piece of ware results upon the completion of the final operation. Furthermore, as this fire head 9 assumes an operative relation with respect to the mold, the gas and air issuing from the nozzle 11 under pressure and in a state of combustion enters the interior of the blank under such pressure that the blank is slightly expanded, thus ironing out any wrinkles or the like which might tend to cause marks or marring of the completed article.

It is to be understood that, if I employ the fire head 9 and it is brought into operation before final blowing, it may be used under a great number of varying conditions. The pressure of burning gas and air issuing from the nozzle 11 may be varied to vary the extent of initial expansion of the bowl blank. The degree of heating effect upon the interior of the bowl blank may be regulated by regulating the proportions of gas and air or both which are admitted to the fire head 9.

Furthermore, the burning gas and air issuing from the nozzle 11 may be of such pressure and in such proportions that the fire head 9 may be moved down into a tight seating position upon the mold ring 3 so that the article will be blown to its final shape by the operation of fire head 9, whereby the operation of the blow head 12 may be dispensed with. By such an operation of the fire head 9, it is seen that the fire polishing and blowing of the article takes place at one and the same time by the operation of a single piece of apparatus.

When the blank is ready for final blowing, the blow head 12 is moved into place upon the mold ring 3 as shown in Figure 4 of the drawing. Air is then admitted through the passage 13 in the blow head 12 and hence into the interior of the slightly expanded blank, whereupon the blank is blown into the final shape as shown in Figures 4 and 5.

If the fire head is brought in operation to fire polish the interior of the article after blowing instead of before blowing, then after the article has been shaped as shown in Figure 4, the blow head 12 is removed and the fire head 9 is brought into operation in the same manner and with the same effect as described in connection with Figure 3.

After the article receives its shape and is ready for annealing as shown in Figure 5, it is then placed in an annealing oven. After the article has been annealed, the top portion is cut off at about the line A—A (Figure 5). The rough edges, if any, at the cutting point are then smoothed and polished. The article is then ready for packing.

It will be understood that the use of the heating treatment hereinbefore described in connection with my method is not necessary for the successful use of my method and that my method may be successfully carried out by performing the successive steps of delivery of proper amount of glass to the mold and shaping as shown in Figure 1, then transferring the shaped mass to the blow mold as shown in Figure 2 and then blowing as shown in Figure 4. However, the use of such heat treatment may be desirable in certain instances according to the operative and manufacturing conditions.

From the foregoing it will be readily seen that I have provided a highly efficient, but simple method for manufacturing stemmed and footed glass articles by the press and blow process. My method makes possible the manufacture of a high quality of stemmed and footed glassware in a cheap and inexpensive manner. Uniformity and durability of product is accomplished with an increase in production. The glass articles are made in a single integral piece, from a single mass of glass, thus eliminating joints which naturally weaken the article. All of this is made possible in addition to the fact that by my method it is possible to manufacture stemmed glass articles of thin-walled bowls by the use of automatic machinery without dealing with the problems of the human element.

Having thus described my invention what I claim is:

1. The method of manufacturing stemmed glassware which comprises depositing a charge of glass in a mold, moving an implement into the mold to form a blow blank, the same implement forming a stem and base integral with the blow blank from the same mass of glass and subsequently blowing the blank.

2. The method of manufacturing stemmed glassware by pressing and blowing which comprises depositing a charge of glass in a mold, pressing the glass in the mold to form a blow blank at the same time forming a stem and base integral with the blank from the same mass of glass and then blowing the blank.

3. The method of manufacturing stemmed glassware by pressing and blowing which comprises depositing a charge of glass in a mold, moving a pressing implement into the mold to press the stem and base of the article, the same implement also forming a blow blank integral with the stem, and then blowing the blank.

4. The method of manufacturing stemmed glassware by pressing and blowing which comprises depositing a charge of glass in a mold, moving a pressing implement into the mold to press the stem and base of the article, the same implement also forming an initial opening in a blow blank integral with the stem, and then blowing the blank.

5. The method of manufacturing stemmed glassware which comprises automatically and successively depositing charges of glass in successively presented blank molds with grooved rings thereon, moving an implement into the mold to form a blow blank and force the glass up into the groove of said ring, the same implement forming a stem and base integral with the blow blank from the same mass of glass, and subsequently blowing the blank.

6. The method of manufacturing stemmed glassware which comprises automatically and successively depositing charges of glass in successively presented blank molds with grooved rings thereon, moving an implement into the mold to form a blow blank and force the glass up into the groove of said ring, the same implement forming a stem and base integral with the blow blank from the same mass of glass, supporting the upper end of the blow blank by the grooved ring during transfer to a blowing mold and subsequently blowing the blank.

7. The method of manufacturing stemmed glassware which comprises automatically and successively depositing charges of glass in successively presented blank molds with grooved rings thereon, moving an implement into the mold to form a blow blank and force the glass up into the groove of said ring, the same implement forming a stem and base integral with the blow blank from the same mass of glass, supporting the upper end of the blow blank by the grooved ring during transfer to a blowing mold, moving a blow head down into contact with the ring and subsequently blowing the blank.

8. The method of manufacturing stemmed glassware which comprises automatically and successively depositing charges of glass in successively presented blank molds with grooved rings thereon, moving an implement into the mold to form a blow blank and force the glass up into the groove of said ring, the same implement forming a stem and base integral with the blow blank from the same mass of glass, supporting the upper end of the blow blank by the grooved ring and the lower end by a mold section during transfer to a blowing mold and subsequently blowing the blank.

9. The method of manufacturing stemmed glassware which comprises automatically and successively depositing charges of glass in successively presented molds with grooved rings thereon, moving an implement into the mold to form a blow blank and force the glass up into the groove of said ring, the same implement forming a stem and base integral with the blow blank from the same mass of glass, supporting the upper end of the blow blank by the grooved ring and the lower end by a mold section during transfer to a blowing mold, moving a blow head down into contact with the ring and subsequently blowing the blank.

In testimony whereof I hereby affix my signature.

GEORGE S. DUNBAR.